United States Patent
Yu

(10) Patent No.: US 11,909,269 B2
(45) Date of Patent: Feb. 20, 2024

(54) COMBINED FIXED FAN FOR DISC-TYPE MOTOR

(71) Applicant: Renwei Yu, Wuhan (CN)

(72) Inventor: Renwei Yu, Wuhan (CN)

( * ) Notice: Subject to any disclaimer, the term of this patent is extended or adjusted under 35 U.S.C. 154(b) by 462 days.

(21) Appl. No.: 17/383,522

(22) Filed: Jul. 23, 2021

(65) Prior Publication Data
US 2021/0351663 A1    Nov. 11, 2021

Related U.S. Application Data

(63) Continuation of application No. PCT/CN2019/096960, filed on Jul. 21, 2019.

(51) Int. Cl.
*H02K 1/20* (2006.01)
*H02K 1/2798* (2022.01)
*H02K 9/06* (2006.01)

(52) U.S. Cl.
CPC ............. *H02K 1/2798* (2022.01); *H02K 9/06* (2013.01)

(58) Field of Classification Search
CPC ............... H02K 1/20; H02K 1/32; H02K 9/06
See application file for complete search history.

(56) References Cited

U.S. PATENT DOCUMENTS

| | | | |
|---|---|---|---|
| 4,459,087 A * | 7/1984 | Barge | H02K 1/246 416/189 |
| 5,925,960 A * | 7/1999 | Hayes | H02K 9/06 29/889.3 |
| 6,720,688 B1 * | 4/2004 | Schiller | H02K 1/2796 310/58 |
| 10,060,442 B2 | 8/2018 | Mornan et al. | |
| 2008/0211326 A1 | 9/2008 | Kang et al. | |
| 2017/0159663 A1 | 6/2017 | Jang | |

FOREIGN PATENT DOCUMENTS

| | | |
|---|---|---|
| CN | 102263457 A | 11/2011 |
| CN | 107846096 A | 3/2018 |
| CN | 109586508 A | 4/2019 |
| CN | 109904985 A | 6/2019 |
| EP | 3104504 A1 | 12/2016 |
| JP | 2001055995 A | 2/2001 |

OTHER PUBLICATIONS

Internation Search Report of PCT/CN2019/096960, dated Apr. 17, 2020.

* cited by examiner

*Primary Examiner* — Dang D Le

(57) ABSTRACT

A combined fixed fan for a disc-type motor includes a front fixing sheet (1), a fan (2) and a rear fixing sheet (3) in sequence in an axial direction, wherein the front fixing sheet and the rear fixing sheet are both circular sheets with a central hole (10), and are provided with magnet fixing holes (4) evenly arranged in a circle, the fan (2) is integrally provided with an annular column-shaped spacing frame (11), a center of the fan (2) is axially provided with a shaft hole (15) for a motor rotating shaft to pass through, and a plurality of fan blades (13) arranged around the shaft hole (15) are arranged in the spacing frame (11); and a side surface of the spacing frame is provided with a plurality of air outlet channels (16) evenly arranged in a circle.

10 Claims, 3 Drawing Sheets

COMBINED FIXED FAN FOR DISC-TYPE MOTOR

CROSS-REFERENCE TO RELATED APPLICATIONS

This application is a continuation of International Patent Application No. PCT/CN2019/096960 with a filing date of Jul. 21, 2019, designating the United States. The content of the aforementioned applications, including any intervening amendments thereto, are incorporated herein by reference.

TECHNICAL FIELD

The present invention relates to a disc-type motor, and more particularly, to a combined fixed fan for a disc-type motor.

BACKGROUND

A disc-type motor has the advantages of a small volume and a light weight, but a traditional disc-type motor has a low power density and a low output efficiency. The inventor discovered a technical solution of a disc-type motor capable of breaking through the bottleneck of the traditional disc-type motor through experiments. When the disc-type motor is applied to a disc-type generator, besides improving an output efficiency by matching a stator with a rotor, cooling, reducing consumption of the generator itself and reducing a line loss are all conducive to further improving the output efficiency.

SUMMARY

The technical problem to be solved by the present invention is to provide a combined fixed fan for a disc-type motor, which further reduces a requirement of a rotor on a total power input of a generator and further improves an output efficiency.

The combined fixed fan for the disc-type motor serves as a component of the disc-type motor, wherein a motor fan fixing frame includes a front rotor frame, a front fixing sheet, a fan, a rear fixing sheet and a rear rotor frame in sequence in an axial direction;

the front rotor frame and the rear rotor frame are circular sheets with a center fixed with a disc-type motor rotating shaft, and are used for annularly arranging and mounting permanent magnets on inside surfaces of the same respectively;

the front fixing sheet and the rear fixing sheet are of the same shape, are both circular sheets with a central hole, and are provided with magnet fixing holes in a circle corresponding to positions of the permanent magnets, a plurality of outer assembling holes are arranged around an inner edge, a plurality of rotor fixing holes are arranged around an outer edge, the rotor fixing holes of the front fixing sheet are fixedly connected with the front rotor frame, and the rotor fixing holes of the rear fixing sheet are fixedly connected with the rear rotor frame;

the fan is integrally provided with an annular column-shaped spacing frame, a center of the fan is axially provided with a shaft hole for the motor rotating shaft to pass through, and a plurality of fan blades arranged around the shaft hole are fixed in the spacing frame; and a side surface of the spacing frame is provided with a plurality of air outlet channels evenly arranged in a circle, and an end surface of the spacing frame is provided with a plurality of inner positioning holes evenly arranged in a circle; and the outer assembling holes of the front fixing sheet and the rear fixing sheet are matched and aligned with the inner positioning holes of the fan in number and position, and the outer assembling holes are connected with the inner positioning holes as a whole by fasteners, and the permanent magnets arranged on the front rotor frame and the rear rotor frame are axially aligned.

Preferably, the front rotor frame, the rear rotor frame, the front fixing sheet and the rear fixing sheet are respectively flat sheets with an equal thickness in all parts except through holes, and the front fixing sheet, the fan and the rear fixing sheet are all made of aluminum alloy or graphene.

Preferably, on the same front fixing sheet or rear fixing sheet, an outer balancing hole is arranged in a spoke between adjacent magnet fixing holes.

The rotor fixing hole is arranged in the spoke radially outside the outer balance hole.

Preferably, on the same front fixing sheet or rear fixing sheet, a plurality of inner balancing holes evenly arranged in a circle are arranged between the magnet fixing holes and the central hole.

Preferably, one end surface of the spacing frame is a back plate with the shaft hole, and an edge of the back plate is integrally or hermetically connected with the spacing frame.

A gap is arranged radially outside the spacing frame for mounting the stator, and an outer diameter of the stator corresponds to an outer diameter of the front fixing sheet or the rear fixing sheet.

Preferably, the air outlet channels are arranged at a position the spacing frame between outer ends of two adjacent fan blades, and the inner positioning holes are arranged in the spacing frame between two adjacent air outlet channels.

As an embodiment, the fan blades are perpendicular to the end surface of the spacing frame.

As an embodiment, an inclination angle is arranged between the fan blade and the back plate.

Preferably, an axial direction of the fan blade extends out of one end of the spacing frame, and an extending length is less than a distance to an outer end cover.

According to the present invention, the fan is supplied with a rotating power by connecting the front fixing sheet and the rear fixing sheet with rotors on both sides, a stator capable of generating heat is arranged between the front fixing sheet and the rear fixing sheet in a non-contact manner, and a pair of rotors rotate synchronously and drive the fan to rotate at the same time. This structure brings obvious effects.

1. A self-loss is reduced, a weight of the rotor is reduced, which reduces rotational inertia, a kinetic energy loss of the rotor is reduced, and an output efficiency is improved.

Improvement of the front and rear fixing sheets is matched with a change of a structure of the rotor, and since structural functions of the front and rear fixing sheets replace partial functions of the rotor, a structural burden of the rotor itself is reduced, and a weight and a process complexity of the rotor are reduced. Since the rotor itself is made of a magnetic conductive material, a simplified structure of the rotor leads to obvious reduction of the weight and the rotational inertia, and a weight of a whole machine is reduced, and power input consumption is reduced, and the output efficiency is improved.

2. A weight of a whole generator is reduced, the structure of the rotor is simplified, a production process is simplified, a production efficiency is improved, and a cost is reduced.

The front and rear fixing sheets are made of light metal aluminum alloy, which is beneficial for heat dissipation and is light in weight, and moreover, the front and rear fixing sheets themselves also play a role of fixing the permanent magnets, replace partial functions of the rotor itself and simplify the structure of the rotor, so that much weight of a rotor frame made of a magnetic conductive material is reduced. The production process of the rotor is simplified, the production efficiency is improved, and the production cost is reduced. Moreover, a mounting accuracy of the permanent magnets is further improved, and a resulting rotation loss is reduced.

3. The rotor and the fixing sheets are simple in structure, which, by comparison, improves an efficiency and a cost of production and processing, and reduces a loss rate of production, and arrangement of the fixing sheets makes mounting and fixing of the permanent magnets more stable, prolongs a service life, improves the mounting accuracy of the permanent magnets and reduces mounting requirements at the same time, and further improves the production efficiency.

4. The spacing frame and the fan are combined and processed integrally, thus reducing a number of assemblies of the whole machine and improving the production efficiency. The spacing frame plays a role of ensuring that the stator outside the fan will not collide with the fan blades, since the front and rear fixing sheets are fixed by the spacing frame, the front and rear fixing sheets are kept parallel, and a distance between the stators is kept, so that the stator is avoided from colliding with rotating parts, and meanwhile, the spacing frame also plays a role of guiding wind and connecting the front and rear fixing sheets, stabilizing relative positions of the front and rear rotor frames, and stabilizing relative positions of the permanent magnets on a pair of rotors.

5. The arrangement of the front and rear fixing sheets increases an area for receiving heat radiation of the stator, and improves a heat radiation effect through emission of aluminum alloy with a high thermal conductivity.

A structure of the fan also greatly increases a heat dissipation area due to arrangement of the spacing frame and the fan blades, and the fan blows air to the back plate in a guiding manner and blows air out through the air outlet channels while dissipating heat received by the front and rear fixed sheets and the fan itself due to heat radiation through a large area of aluminum alloy blades and front and rear fixing sheet bodies, and then blows air to a power supply device through an external air duct to cool a radiator and a heat source, so that the stator has a higher working efficiency at a low temperature, an electrical resistivity of a coil is lower, and a copper loss is reduced, thus being beneficial for improving the output efficiency.

6. The front and rear fixing sheets are provided with a large number of outer balancing holes and inner balancing holes for adjusting a dynamic balance, which increases control over a rotational balance while reducing the rotational inertia of the rotor itself, so that rotation of the rotor is more stable, wear of a bearing is reduced, and a service life is prolonged.

7. The front and rear fixing sheets are fixedly connected with the front and rear rotor frames in parallel respectively, and meanwhile, the front and rear fixing sheets are also axially and fixedly connected with the spacing frame, so that the permanent magnets on a pair of rotors are ensured to be fixed relatively.

Compared with arrangement of depending on the rotor frames instead of the front and rear fixing sheets, arrangement of the present invention further reduces the weight and the rotational inertia, the weight of the rotor is easy to be balanced, the mounting process is also simplified, the cost is reduced, and the output efficiency is obviously improved. After sample tests, under rated power consumption, the efficiency is improved by at least 3% by the arrangement of the front and rear fixing sheets, an average temperature of the rotor is decreased by more than 5° C., and comprehensive oil consumption is decreased by 5%, so that the actual test proves that the effect is obviously improved. However, the improvement of the production process reduces mounting technology requirements, and has a higher production efficiency.

Figure 1:
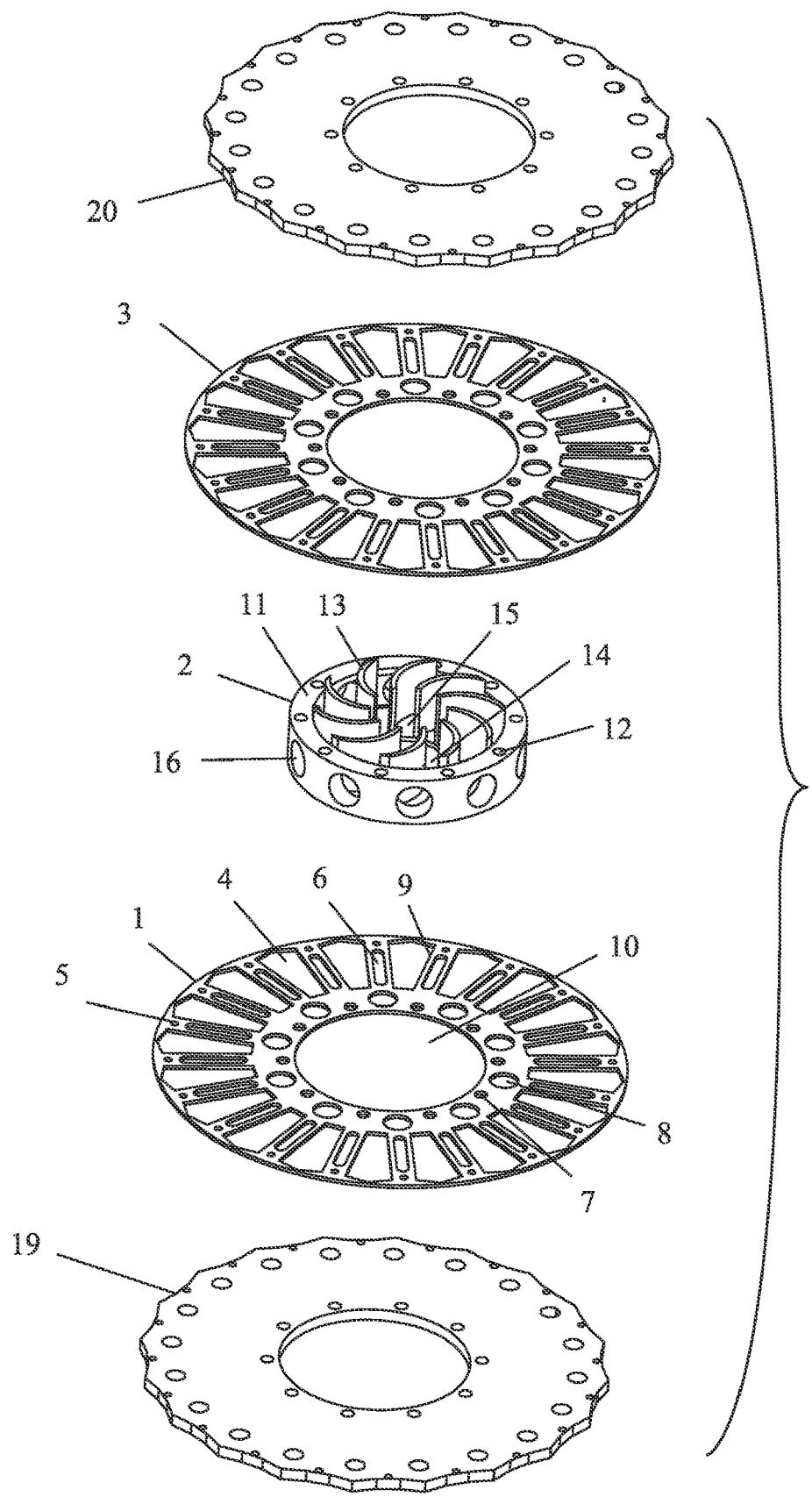
FIG. 1 is an exploded view of an overall structure of the present invention.

In the drawings: 1 refers to front fixing sheet. 2 refers to fan, 3 refers to rear fixing sheet. 4 refers to magnet fixing hole. 5 refers to rotor fixing hole. 6 refers to outer balancing hole. 7 refers to outer assembling hole. 8 refers to inner balancing hole. 9 refers to spoke. 10 refers to central hole. 11 refers to spacing frame, 12 refers to inner positioning hole. 13 refers to fan blade. 14 refers to back plate, 15 refers to shaft hole, 16 refers to air outlet channel, 17 refers to rotor frame. 18 refers to stator. 19 refers to front rotor frame, and 20 refers to rear rotor frame.

DETAILED DESCRIPTION

The present invention is further described with reference to the accompanying drawings: a combined fixed fan for a disc-type motor serves as a component of the disc-type motor, and the disc-type motor is provided with a disc-type rotor with a rotor frame on both sides of a stator coil, wherein the rotor is fixed with a penetrating central shaft, and a stator is fixed with an outer shell. According to the present invention, a fan arranged in a central hole of the stator coil and a rotating sheet part close to an inside surface of the rotor frame synchronously follow the rotor to rotate.

Figure 2:
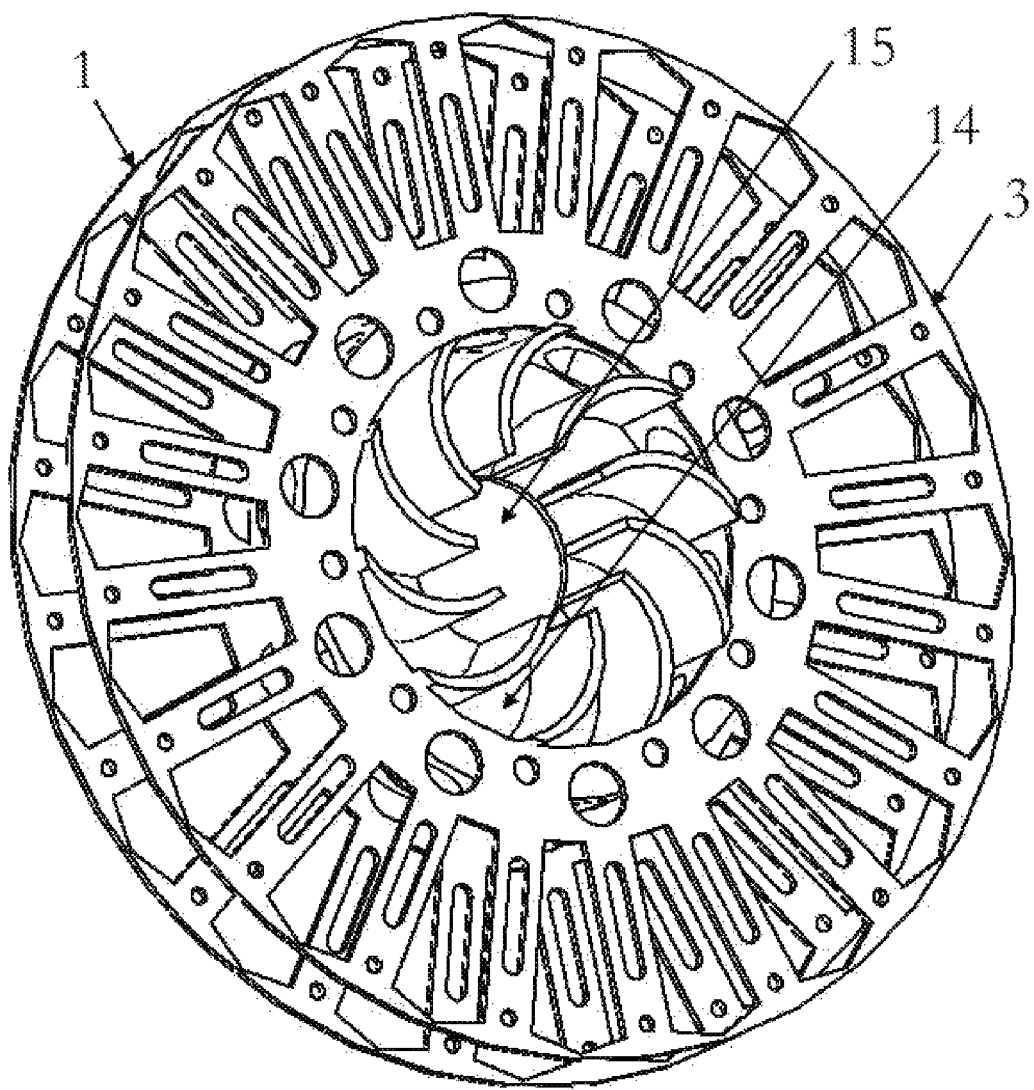
FIG. 2 is a schematic diagram of a combined state of fixing sheets and a fan.

As shown in FIG. 1 and FIG. 2, a disc-type motor fan fixing frame includes a front rotor frame 19, a front fixing sheet 1, a fan 2, a rear fixing sheet 3 and a rear rotor frame 20 in sequence in an axial direction, and the front fixing sheet 1, the fan 2 and the rear fixing sheet 3 rotate synchronously with a rotating shaft.

The front rotor frame 19 and the rear rotor frame 20 are circular sheets with a center fixed with a disc-type motor rotating shaft, and are used for annularly arranging and mounting permanent magnets on inside surfaces of the same respectively. The permanent magnets on the front rotor frame 19 and the rear rotor frame 20 are axially aligned and mounted, and polarity directions of the permanent magnets on the same rotor frame are alternately arranged, while polarity arrangement of the permanent magnets on the other rotor frame is completely consistent with polarity arrangement of the permanent magnets on the above rotor frame, thus forming an alternating magnetic field.

The front rotor frame 19 and the rear rotor frame 20 are both flat sheets with an equal thickness in all parts. The front fixing sheet 1 and the rear fixing sheet 3 are of the same shape, and are both circular sheets with a central hole 10. The front fixing sheet 1 and the rear fixing sheet 3 are both circular sheets with an equal thickness, which is convenient for unified production. The front fixing sheet 1, the fan 2 and the rear fixing sheet 3 are all made of aluminum alloy or graphene with a good strength, a light weight, a good thermal conductivity and a non-magnetic conductivity.

As shown in FIG. 1, the front fixing sheet 1 and the rear fixing sheet 3 are both provided with magnet fixing holes 4 evenly arranged in a circle, and the magnet fixing holes 4 are used for fixing the permanent magnets mounted on the rotor, especially for restricting the permanent magnets from moving during operation of the rotor. If there are no front and rear fixing sheets to restrict the permanent magnets, only a supporting and blocking part axially higher than a disc surface of the rotor frame can be arranged at an outer edge of the permanent magnets corresponding to magnet mounting positions on the rotor frame, while the rotor frame itself is made of a magnetic conductive material with a high density, and the supporting and blocking part is located at a position axially far away from an axis position, which increases a processing difficulty of the rotor frame and increases rotational inertia and weight of the rotor obviously, and increases a processing cost and an overall weight and increases a kinetic energy loss of the rotor correspondingly. In the present invention, the front fixing sheet 1 and the rear fixing sheet 3 play a role of the supporting and blocking part, so that a structure of the rotor frame is completely flat. In the embodiment, the front fixing sheet 1 and the rear fixing sheet 3 are made of aluminum alloy, which reduces the weight. The structure of the rotor frame is simplified, the rotational inertia is reduced, and the processing cost is reduced. Meanwhile, the magnet fixing holes 4 on the front fixing sheet 1 and the rear fixing sheet 3 simplify mounting of the permanent magnets and reduce mounting process requirements, but a stability of the permanent magnets is enhanced, a mounting accuracy is obviously improved, and relative positions of a pair of rotors are stable.

A plurality of outer assembling holes 7 are arranged around an inner edge, and the outer assembling holes 7 are used for fixedly connecting with the fan. A plurality of rotor fixing holes 5 are arranged around an outer edge, and the rotor fixing holes 5 are used for fixedly connecting with the rotor outside the front fixing sheet 1 or the rear fixing sheet 3.

The magnet fixing holes 4 are arranged corresponding to the permanent magnet mounting positions on the rotor frame, the permanent magnets of the rotor of the disc-type motor are annularly mounted around the rotating shaft, taking into account a number of the permanent magnets, a magnetic field strength and a proportion of magnetic lines perpendicular to the disc surface of the rotor, and a gap between the permanent magnets are not too close. On the corresponding front fixing sheet 1 or rear fixing sheet 3, a gap between adjacent magnet fixing holes 4 is a spoke 9. On the same front fixing sheet 1 or rear fixing sheet 3, an outer balancing hole 6 is arranged in the spoke 9 between adjacent magnet fixing holes 4. As shown in FIG. 1, the outer balancing hole 6 is of a slot shape, and the rotor fixing hole 5 is arranged in the spoke 9 radially outside the outer balance hole 6. The outer balancing holes 6 are annularly arranged in a circle, and an adhesive material may be filled from the outside to adjust a rotational balance.

On the same front fixing sheet 1 or rear fixing sheet 3, a plurality of inner balancing holes 8 evenly arranged in a circle are arranged between the magnet fixing holes 4 and the central hole 10. The adhesive material may be filled in the outer balancing holes 8 to adjust the rotational balance.

The fan 2 is integrally provided with an annular column-shaped spacing frame 11, and the spacing frame 11 serves as a supporting base for the fan 2 and the stator, which enlarges a heat dissipation area and plays a role of guiding an air flow at the same time.

A center of the fan 2 is axially provided with a shaft hole 15 for the motor rotating shaft to pass through, a gap may be arranged between the shaft hole 15 and the motor rotating shaft, and the fan and the rotating shaft rotate synchronously during operation.

One end surface of the spacing frame 11 is a back plate 14 with the shaft hole 15, and an edge of the back plate is integrally or hermetically connected with the spacing frame. The back plate blocks the air flow from flowing out backwardly but directly receives the air flow to flow through, and plays a role of a radiator. A plurality of fan blades 13 fixed with an inner wall of the spacing frame and arranged around the shaft hole 15 are arranged in the spacing frame 11. In FIG. 1 and FIG. 2, the fan blades 13 are perpendicular to the end surface of the spacing frame 11, and the fan blades are integrated with the spacing frame. Typically, the fan blade is of a centrifugal fan structure. More preferably, an inclination angle is arranged between the fan blade 13 and the back plate 14. Typically, the fan blade is of an axial flow fan structure or a turbine structure. An axial direction of the fan blade 13 extends out of one end of the spacing frame 11, and an extending length is less than a mounting gap with an outer part. The fan blade 13 extending out of the end surface of the spacing frame can increase a heat dissipation area of the fan itself made of aluminum alloy and makes the air flow blow out unimpededly.

The spacing frame itself increases the heat dissipation area, can play a role of heat dissipation, and isolates the fan blade from the stator, which avoids collision between the fan blade and the stator.

Heat received by the fan itself due to heat radiation and heat of transferring received heat of the stator from the front and rear fixing sheets to the fan are not only dissipated into air through the aluminum alloy material itself, and but also dissipated by driving the air flow through rotation of the fan. Meanwhile, through a diversion function of the fan, the air flow is blown out of the air outlet channels and blown to a power supply device such as a gasoline engine through external diversion channels, so as to cool the device.

A side surface of the spacing frame 11 is provided with a plurality of air outlet channels 16 evenly arranged in a circle, and the air outlet channels 16 are arranged on a side wall of the spacing frame between outer ends of two adjacent fan blades 13. When the fan rotates, the air flow enters between the fan blades 13 through an air inlet hole 16, and due to blocking by the back plate at the rear, the air flow is pushed out to a side edge of the spacing frame, and is blown to the stator and blown to the power supply device through the external diversion channels at the same time.

The front fixing sheet 1, the rear fixing sheet 3 and the fan 2 are arranged on a same axial line The end surface of the spacing frame is provided with a plurality of inner positioning holes 12 evenly arranged in a circle, and the inner positioning holes 12 are arranged at a position of the spacing frame between two adjacent air outlet channels 16. The outer assembling holes 7 of the front fixing sheet 1 and the rear fixing sheet 3 are matched and aligned with the inner positioning holes 12 in the end surface of the spacing frame of the fan 2 in number and position, and the front fixing sheet 1, the rear fixing sheet 3 and the fan 2 are connected as a whole by fasteners. The front fixing sheet 1 is fixedly connected with the front rotor frame 19 through the fasteners passing through the rotor fixing holes 5, and the rear fixing sheet 3 is fixedly connected with the rear rotor frame 20 through the fasteners passing through the rotor fixing holes 5. A fan fixing frame is driven to rotate by the power supply device.

The spacing frame not only isolates the fan blades from the stator, but also plays a role of heat dissipation, diversion and stabilization of the relative positions of the permanent magnets on a pair of rotors. The front fixing sheet 1 and the rear fixing sheet 3 are connected and mounted, and the permanent magnets on the front rotor frame 19 and the rear rotor frame 20 are axially aligned, thus ensuring a stability of the relative positions of the permanent magnets on a pair of rotors.

Figure 3:
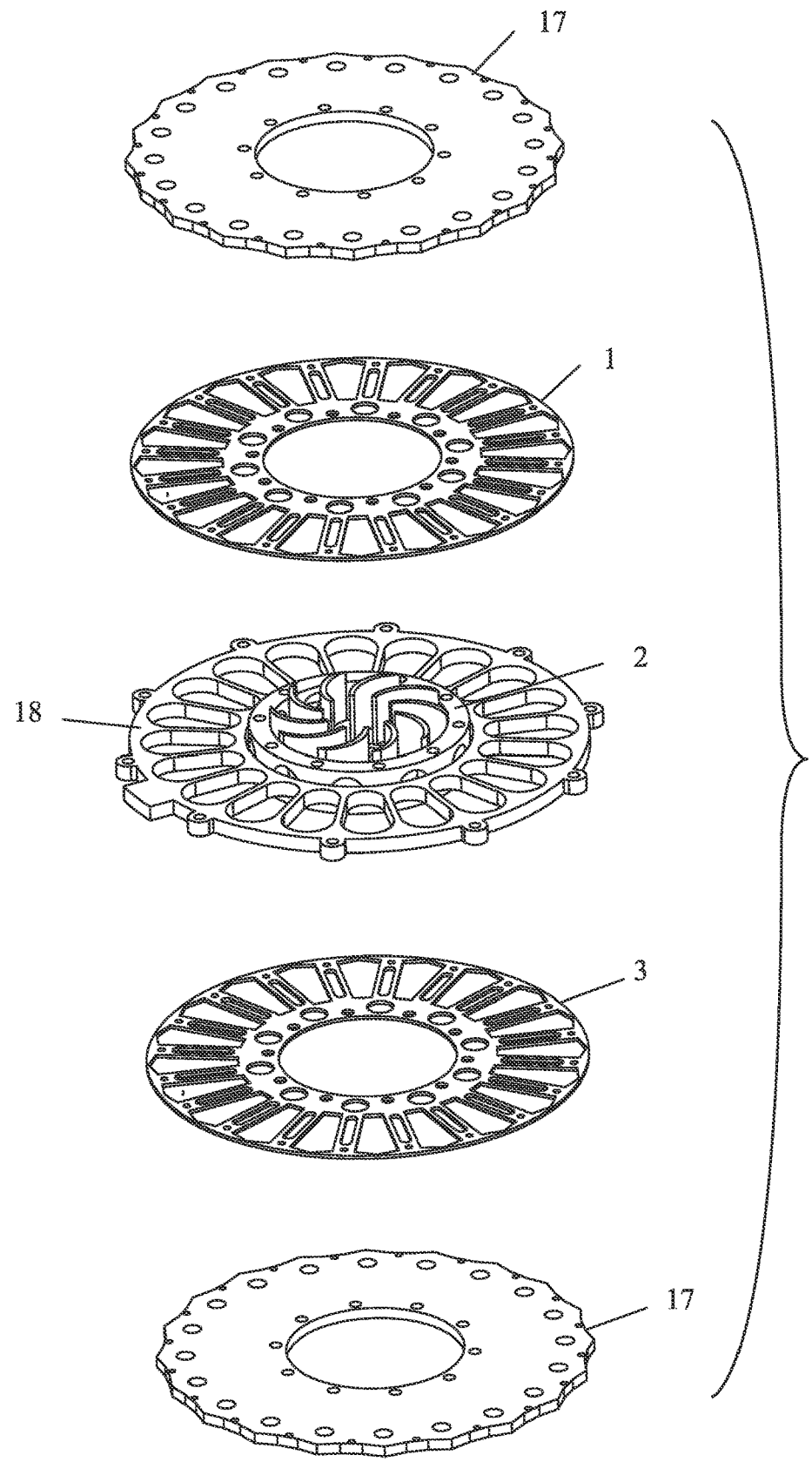
FIG. 3 is a schematic diagram of relative positions between the present invention and a stator of a disc-type motor.

As shown in FIG. 3, a gap is arranged radially outside the spacing frame for mounting the stator, and an outer diameter of the stator corresponds to an outer diameter of the front fixing sheet or the rear fixing sheet.

What is claimed is:

1. A combined fixed fan for a disc-type motor serving as a component of the disc-type motor, wherein a motor fan fixing frame comprises a front rotor frame (19), a front fixing sheet (1), a fan (2), a rear fixing sheet (3) and a rear rotor frame (20) in sequence in an axial direction:

the front rotor frame (19) and the rear rotor frame (20) are circular sheets with a center fixed with a disc-type motor rotating shaft, and are used for annularly arranging and mounting permanent magnets on inside surfaces of the same respectively;

the front fixing sheet (1) and the rear fixing sheet (3) are of the same shape, are both circular sheets with a central hole (10), and are provided with magnet fixing holes (4) in a circle corresponding to positions of the permanent magnets, a plurality of outer assembling holes (7) are arranged around an inner edge, a plurality of rotor fixing holes (5) are arranged around an outer edge, the rotor fixing holes (5) of the front fixing sheet (1) are fixedly connected with the front rotor frame (19), and the rotor fixing holes (5) of the rear fixing sheet (3) are fixedly connected with the rear rotor frame (20);

the fan (2) is integrally provided with an annular column-shaped spacing frame (11), a center of the fan (2) is axially provided with a shaft hole (15) for the motor rotating shaft to pass through, and a plurality of fan blades (13) arranged around the shaft hole (15) are fixed in the spacing frame (11); and a side surface of the spacing frame is provided with a plurality of air outlet channels (16) evenly arranged in a circle, and an end surface of the spacing frame is provided with a plurality of inner positioning holes (12) evenly arranged in a circle; and the outer assembling holes (7) of the front fixing sheet (1) and the rear fixing sheet (3) are matched and aligned with the inner positioning holes (12) of the fan (2) in number and position, and the outer assembling holes are connected with the inner positioning holes as a whole by fasteners, and the permanent magnets arranged on the front rotor frame (19) and the rear rotor frame (20) are axially aligned.

2. The combined fixed fan for the disc-type motor according to claim 1, wherein the front rotor frame (19), the rear rotor frame (20), the front fixing sheet (1) and the rear fixing sheet (3) are respectively flat sheets with an equal thickness in all parts except through holes, and the front fixing sheet (1), the fan (2) and the rear fixing sheet (3) are all made of aluminum alloy or graphene.

3. The combined fixed fan for the disc-type motor according to claim 1, wherein on the same front fixing sheet (1) or rear fixing sheet (3), an outer balancing hole (6) is arranged in a spoke (9) between adjacent magnet fixing holes (4).

4. The combined fixed fan for the disc-type motor according to claim 3, wherein the rotor fixing hole (5) is arranged in the spoke (9) radially outside the outer balance hole (6).

5. The combined fixed fan for the disc-type motor according to claim 1, wherein on the same front fixing sheet (1) or rear fixing sheet (3), a plurality of inner balancing holes (8) evenly arranged in a circle are arranged between the magnet fixing holes (4) and the central hole (10).

6. The combined fixed fan for the disc-type motor according to claim 1, wherein one end surface of the spacing frame (11) is a back plate (14) with the shaft hole (15), and an edge of the back plate is integrally or hermetically connected with the spacing frame.

7. The combined fixed fan for the disc-type motor according to claim 1, wherein the air outlet channels (16) are arranged at a position the spacing frame between outer ends of two adjacent fan blades (13), and the inner positioning holes (12) are arranged in the spacing frame between two adjacent air outlet channels (16).

8. The combined fixed fan for the disc-type motor according to claim 1, wherein the fan blades (13) are perpendicular to the end surface of the spacing frame (11).

9. The combined fixed fan for the disc-type motor according to claim 6, wherein an inclination angle is arranged between the fan blade (13) and the back plate (14).

10. The combined fixed fan for the disc-type motor according to claim 1, wherein an axial direction of the fan blade (13) extends out of one end of the spacing frame (11), and an extending length is less than a distance to an outer end cover.

\* \* \* \* \*